US010759113B2

(12) United States Patent
Tyler et al.

(10) Patent No.: US 10,759,113 B2
(45) Date of Patent: Sep. 1, 2020

(54) ADDITIVE MANUFACTURING SYSTEM HAVING TRAILING CURE MECHANISM

(71) Applicant: CC3D LLC, Coeur d'Alene, ID (US)

(72) Inventors: Kenneth Lyle Tyler, Coeur d'Alene, ID (US); Ryan C. Stockett, Lebanon, NH (US)

(73) Assignee: Continuous Composites Inc., Coeur d'Alene, ID (US)

( * ) Notice: Subject to any disclaimer, the term of this patent is extended or adjusted under 35 U.S.C. 154(b) by 503 days.

(21) Appl. No.: 15/673,751

(22) Filed: Aug. 10, 2017

(65) Prior Publication Data

US 2018/0065299 A1 Mar. 8, 2018

Related U.S. Application Data

(60) Provisional application No. 62/526,448, filed on Jun. 29, 2017, provisional application No. 62/383,801, filed on Sep. 6, 2016.

(51) Int. Cl.
*B29C 64/209* (2017.01)
*B29C 64/106* (2017.01)
*B29C 64/393* (2017.01)
*B33Y 30/00* (2015.01)
*B33Y 50/02* (2015.01)
*B29C 64/118* (2017.01)

(52) U.S. Cl.
CPC .......... *B29C 64/209* (2017.08); *B29C 64/106* (2017.08); *B29C 64/118* (2017.08); *B29C 64/393* (2017.08); *B33Y 30/00* (2014.12); *B33Y 50/02* (2014.12)

(58) Field of Classification Search
CPC ... B29C 64/209; B29C 64/273; B29C 64/277; B29C 64/264; B29C 64/106; B29C 64/118; B33Y 50/02; B33Y 30/00; B29K 2105/08
See application file for complete search history.

(56) References Cited

U.S. PATENT DOCUMENTS

| 3,286,305 A | 11/1966 | Seckel |
| 3,809,514 A | 5/1974 | Nunez |
| 3,984,271 A | 10/1976 | Gilbu |

(Continued)

FOREIGN PATENT DOCUMENTS

| DE | 4102257 A1 | 7/1992 |
| EP | 2589481 B1 | 1/2016 |

(Continued)

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).

(Continued)

*Primary Examiner* — Joseph S Del Sole
*Assistant Examiner* — Jerzi H Moreno Hernandez
(74) *Attorney, Agent, or Firm* — Ryan C. Stockett

(57) ABSTRACT

A head is disclosed for an additive manufacturing system. The head may include a nozzle configured to discharge a matrix, and at least one cure enhancer configured to enhance curing of the matrix. The head may also include a curving manipulator configured to trail behind the nozzle and provide mounting for the at least one cure enhancer.

18 Claims, 2 Drawing Sheets

(56) References Cited

U.S. PATENT DOCUMENTS

| | | |
|---|---|---|
| 3,993,726 A | 11/1976 | Moyer |
| 4,643,940 A | 2/1987 | Shaw et al. |
| 4,671,761 A | 6/1987 | Adrian et al. |
| 4,822,548 A | 4/1989 | Hempel |
| 4,851,065 A | 7/1989 | Curtz |
| 5,002,712 A | 3/1991 | Goldmann et al. |
| 5,037,691 A | 8/1991 | Medney et al. |
| 5,296,335 A | 3/1994 | Thomas et al. |
| 5,340,433 A | 8/1994 | Crump |
| 5,746,967 A | 5/1998 | Hoy et al. |
| 5,866,058 A | 2/1999 | Batchelder et al. |
| 5,936,861 A | 8/1999 | Jang et al. |
| 6,153,034 A | 11/2000 | Lipsker |
| 6,459,069 B1 | 10/2002 | Rabinovich |
| 6,501,554 B1 | 12/2002 | Hackney et al. |
| 6,799,081 B1 | 9/2004 | Hale et al. |
| 6,803,003 B2 | 10/2004 | Rigali et al. |
| 6,934,600 B2 | 8/2005 | Jang et al. |
| 7,039,485 B2 | 5/2006 | Engelbart et al. |
| 7,555,404 B2 | 6/2009 | Brennan et al. |
| 7,795,349 B2 | 9/2010 | Bredt et al. |
| 8,221,669 B2 | 7/2012 | Batchelder et al. |
| 8,962,717 B2 | 2/2015 | Roth et al. |
| 9,126,365 B1 | 9/2015 | Mark et al. |
| 9,126,367 B1 | 9/2015 | Mark et al. |
| 9,149,988 B2 | 10/2015 | Mark et al. |
| 9,156,205 B2 | 10/2015 | Mark et al. |
| 9,186,846 B1 | 11/2015 | Mark et al. |
| 9,186,848 B2 | 11/2015 | Mark et al. |
| 9,327,452 B2 | 5/2016 | Mark et al. |
| 9,327,453 B2 | 5/2016 | Mark et al. |
| 9,370,896 B2 | 6/2016 | Mark |
| 9,381,702 B2 | 7/2016 | Hollander |
| 9,457,521 B2 | 10/2016 | Johnston et al. |
| 9,458,955 B2 | 10/2016 | Hammer et al. |
| 9,527,248 B2 | 12/2016 | Hollander |
| 9,539,762 B2 | 1/2017 | Durand et al. |
| 9,579,851 B2 | 2/2017 | Mark et al. |
| 9,688,028 B2 | 6/2017 | Mark et al. |
| 9,694,544 B2 | 7/2017 | Mark et al. |
| 9,764,378 B2 | 9/2017 | Mit |
| 9,770,876 B2 | 9/2017 | Farmer et al. |
| 9,782,926 B2 | 10/2017 | Witzel et al. |
| 2002/0009935 A1 | 1/2002 | Hsiao et al. |
| 2002/0062909 A1 | 5/2002 | Jang et al. |
| 2002/0113331 A1 | 8/2002 | Zhang et al. |
| 2002/0165304 A1 | 11/2002 | Mulligan et al. |
| 2003/0044539 A1 | 3/2003 | Oswald |
| 2003/0056870 A1 | 3/2003 | Comb et al. |
| 2003/0160970 A1 | 8/2003 | Basu et al. |
| 2003/0186042 A1 | 10/2003 | Dunlap et al. |
| 2003/0236588 A1 | 12/2003 | Jang et al. |
| 2005/0006803 A1 | 1/2005 | Owens |
| 2005/0061422 A1 | 3/2005 | Martin |
| 2005/0065400 A1 | 3/2005 | Banik et al. |
| 2005/0104257 A1* | 5/2005 | Gu ................... B29C 41/36 264/401 |
| 2005/0109451 A1 | 5/2005 | Hauber et al. |
| 2005/0230029 A1 | 10/2005 | Vaidyanathan et al. |
| 2007/0003650 A1 | 1/2007 | Schroeder |
| 2007/0228592 A1 | 10/2007 | Dunn et al. |
| 2008/0176092 A1 | 7/2008 | Owens |
| 2009/0095410 A1 | 4/2009 | Oldani |
| 2011/0032301 A1 | 2/2011 | Fienup et al. |
| 2011/0143108 A1 | 6/2011 | Fruth et al. |
| 2012/0060468 A1 | 3/2012 | Dushku et al. |
| 2012/0159785 A1 | 6/2012 | Pyles et al. |
| 2012/0231225 A1 | 9/2012 | Mikulak et al. |
| 2012/0247655 A1 | 10/2012 | Erb et al. |
| 2013/0164498 A1 | 6/2013 | Langone et al. |
| 2013/0209600 A1 | 8/2013 | Tow |
| 2013/0233471 A1 | 9/2013 | Kappesser et al. |
| 2013/0292039 A1 | 11/2013 | Peters et al. |
| 2013/0337256 A1 | 12/2013 | Farmer et al. |
| 2013/0337265 A1 | 12/2013 | Farmer |
| 2014/0034214 A1 | 2/2014 | Boyer et al. |
| 2014/0061974 A1 | 3/2014 | Tyler |
| 2014/0159284 A1 | 6/2014 | Leavitt |
| 2014/0232035 A1 | 8/2014 | Bheda |
| 2014/0268604 A1 | 9/2014 | Wicker et al. |
| 2014/0291886 A1* | 10/2014 | Mark ................... B29C 48/92 264/163 |
| 2015/0136455 A1* | 5/2015 | Fleming ............... H05K 3/0014 174/255 |
| 2015/0217517 A1* | 8/2015 | Karpas ................. B33Y 40/00 264/464 |
| 2016/0012935 A1 | 1/2016 | Rothfuss |
| 2016/0031155 A1 | 2/2016 | Tyler |
| 2016/0046082 A1* | 2/2016 | Fuerstenberg ........ B29C 70/021 264/480 |
| 2016/0052208 A1 | 2/2016 | Debora et al. |
| 2016/0059449 A1* | 3/2016 | Tien ..................... B29C 43/52 264/571 |
| 2016/0082641 A1 | 3/2016 | Bogucki et al. |
| 2016/0082659 A1 | 3/2016 | Hickman et al. |
| 2016/0107379 A1 | 4/2016 | Mark et al. |
| 2016/0114532 A1 | 4/2016 | Schirtzinger et al. |
| 2016/0136885 A1 | 5/2016 | Nielsen-Cole et al. |
| 2016/0144566 A1 | 5/2016 | Mark et al. |
| 2016/0144570 A1* | 5/2016 | Kim ..................... B29C 35/0805 425/174.4 |
| 2016/0159009 A1* | 6/2016 | Canale .................. B33Y 10/00 264/401 |
| 2016/0192741 A1 | 7/2016 | Mark |
| 2016/0200047 A1 | 7/2016 | Mark et al. |
| 2016/0243762 A1 | 8/2016 | Fleming et al. |
| 2016/0263806 A1 | 9/2016 | Gardiner |
| 2016/0263822 A1 | 9/2016 | Boyd |
| 2016/0263823 A1 | 9/2016 | Espiau et al. |
| 2016/0266573 A1* | 9/2016 | Bheda ................. G05B 19/4099 |
| 2016/0271876 A1 | 9/2016 | Lower |
| 2016/0297104 A1 | 10/2016 | Guillemette et al. |
| 2016/0311165 A1 | 10/2016 | Mark et al. |
| 2016/0325491 A1 | 11/2016 | Sweeney et al. |
| 2016/0332369 A1 | 11/2016 | Shah et al. |
| 2016/0339633 A1 | 11/2016 | Stolyarov et al. |
| 2016/0346998 A1 | 12/2016 | Mark et al. |
| 2016/0361869 A1 | 12/2016 | Mark et al. |
| 2016/0368213 A1 | 12/2016 | Mark |
| 2016/0368255 A1 | 12/2016 | Witte et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007362 A1 | 1/2017 | Chen et al. |
| 2017/0007363 A1 | 1/2017 | Boronkay |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008333 A1 | 1/2017 | Mason et al. |
| 2017/0015059 A1 | 1/2017 | Lewicki |
| 2017/0015060 A1 | 1/2017 | Lewicki et al. |
| 2017/0021565 A1 | 1/2017 | Deaville |
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028644 A1 | 2/2017 | Evans et al. |
| 2017/0030207 A1 | 2/2017 | Kittleson |

(56) References Cited

U.S. PATENT DOCUMENTS

| | | |
|---|---|---|
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda |
| 2017/0106565 A1 | 4/2017 | Braley et al. |
| 2017/0120519 A1 | 5/2017 | Mark |
| 2017/0129170 A1* | 5/2017 | Kim ........................ B33Y 10/00 |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0165914 A1* | 6/2017 | Czaplewski ........ B29C 35/0805 |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0246803 A1* | 8/2017 | Johnson ................. B29C 64/40 |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |
| 2018/0154588 A1* | 6/2018 | Wilenski ................. B33Y 10/00 |
| 2018/0311898 A1* | 11/2018 | Schwarzbaum .... B29C 35/0805 |
| 2018/0370129 A1* | 12/2018 | Natale ................... B29C 70/382 |

FOREIGN PATENT DOCUMENTS

| | | |
|---|---|---|
| EP | 3219474 A1 | 9/2017 |
| KR | 100995983 B1 | 11/2010 |
| KR | 101172859 B1 | 8/2012 |
| WO | 2013017284 A2 | 2/2013 |
| WO | 2016088042 A1 | 6/2016 |
| WO | 2016088048 A1 | 6/2016 |
| WO | 2016110444 A1 | 7/2016 |
| WO | 2016125138 A2 | 8/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |

OTHER PUBLICATIONS

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

International Search Report dated Oct. 13, 2016 for PCT/US2016/042906 to CC3D LLC Filed Jul. 19, 2016.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).

M. Martin-Gallego et al., Epoxy-Graphene UV-Cured Nanocomposites, Polymer, vol. 52, Issue 21, pp. 4664-4669 (Sep. 2011).

P. Compston, J. Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).

S Kumar & J.-P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

Vincent J. Lopata et al., Electron-Beam-Curable Epoxy Resins for the Manufacture of High-Performance Composites, Radiation Physics and Chemistry, vol. 56, pp. 405-415 (1999).

Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-3805 (May 15, 2012).

International Search Report dated Oct. 30, 2017 for PCT/US2017/047391 to CC3D LLC filed Aug. 17, 2017.

* cited by examiner

ADDITIVE MANUFACTURING SYSTEM HAVING TRAILING CURE MECHANISM

RELATED APPLICATIONS

This application is based on and claims the benefit of priority from United States Provisional Application Nos. 62/383,801 that was filed on Sep. 6, 2016, and 62/526,448 that was filed on Jun. 29, 2017, the contents of all of which are expressly incorporated herein by reference.

TECHNICAL FIELD

The present disclosure relates generally to a manufacturing system and, more particularly, to an additive manufacturing system having a trailing cure mechanism.

BACKGROUND

Extrusion manufacturing is a known process for producing continuous structures. During extrusion manufacturing, a liquid matrix (e.g., a thermoset resin or a heated thermoplastic) is pushed through a die having a desired cross-sectional shape and size. The material, upon exiting the die, cures and hardens into a final form. In some applications, UV light and/or ultrasonic vibrations are used to speed the cure of the liquid matrix as it exits the die. The structures produced by the extrusion manufacturing process can have any continuous length, with a straight or curved profile, a consistent cross-sectional shape, and excellent surface finish. Although extrusion manufacturing can be an efficient way to continuously manufacture structures, the resulting structures may lack the strength required for some applications.

Pultrusion manufacturing is a known process for producing high-strength structures. During pultrusion manufacturing, individual fiber strands, braids of strands, and/or woven fabrics are coated with or otherwise impregnated with a liquid matrix (e.g., a thermoset resin or a heated thermoplastic) and pulled through a stationary die where the liquid matrix cures and hardens into a final form. As with extrusion manufacturing, UV light and/or ultrasonic vibrations are used in some pultrusion applications to speed the cure of the liquid matrix as it exits the die. The structures produced by the pultrusion manufacturing process have many of the same attributes of extruded structures, as well as increased strength due to the integrated fibers. Although pultrusion manufacturing can be an efficient way to continuously manufacture high-strength structures, the resulting structures may lack the form (shape, size, and/or precision) required for some applications. In addition, conventional pultrusion manufacturing may lack flexibility in cure-rate, cure-shape, and/or cure-location of the liquid matrix.

The disclosed system is directed to addressing one or more of the problems set forth above and/or other problems of the prior art.

SUMMARY

In one aspect, the present disclosure is directed to a head for an additive manufacturing system. The head may include a nozzle configured to discharge a matrix, and at least one cure enhancer configured to enhance curing of the matrix. The head may also include a curving manipulator configured to trail behind the nozzle and provide mounting for the at least one cure enhancer.

In another aspect, the present disclosure is directed to another head for an additive manufacturing system. This head may include a nozzle configured to discharge a matrix. The head may also include an internal cure enhancer configured to trail behind the nozzle and effect curing of the matrix from inside of the matrix.

In yet another aspect, the present disclosure is directed to an additive manufacturing system. The additive manufacturing system may include a support, and a head mounted to the support. The head may include a nozzle configured to discharge a material including at least a matrix, a first type of cure enhancer configured to enhance external curing of the matrix, and a second type of cure enhancer configured to enhance internal curing of the matrix. The additive manufacturing system may also include a controller configured to regulate operation of the support and the first and second types of cure enhancers.

DETAILED DESCRIPTION

Figure 1:
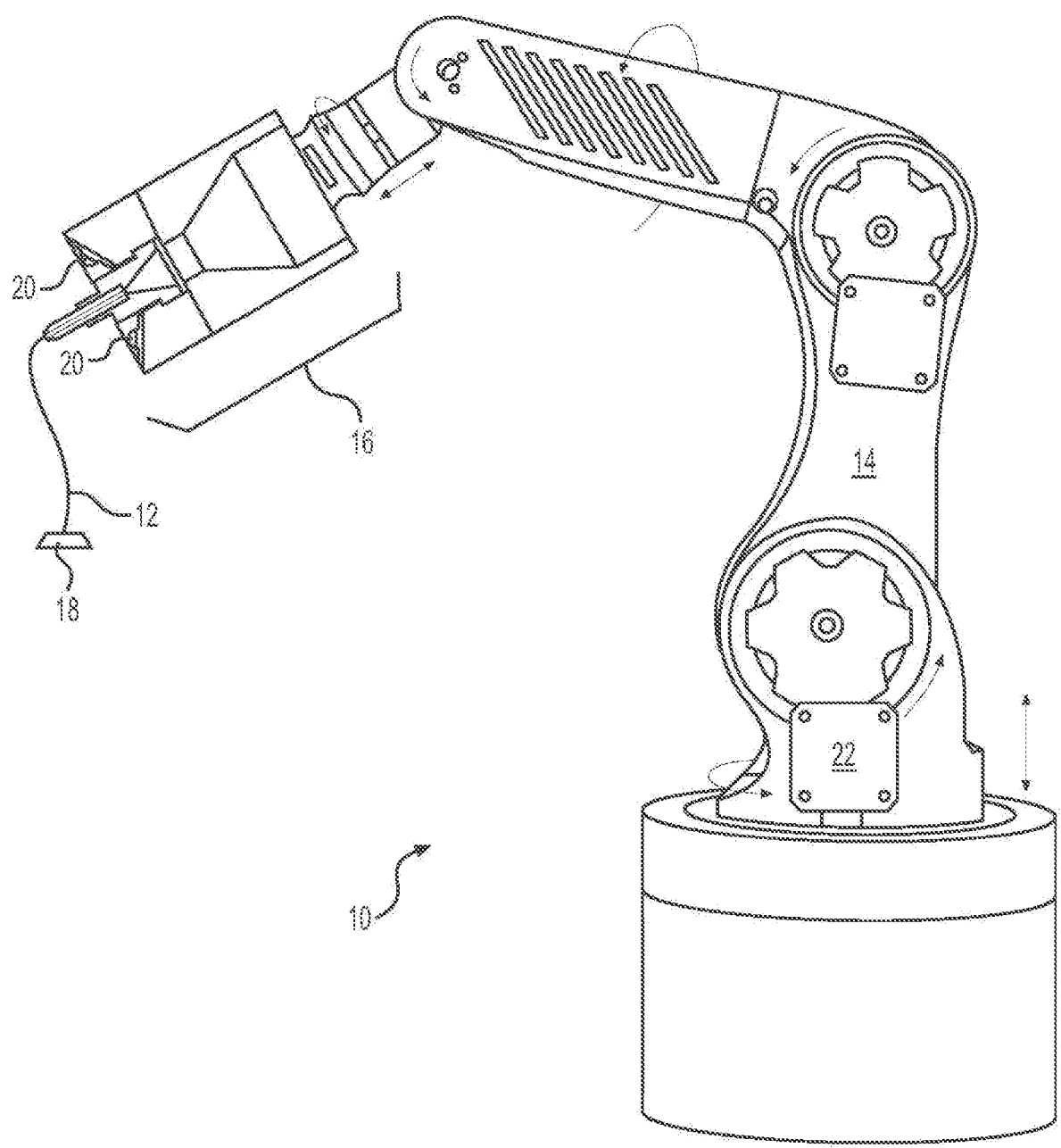
FIG. 1 is a diagrammatic illustration of an exemplary disclosed manufacturing system.

FIG. 1 illustrates an exemplary system 10, which may be used to continuously manufacture a composite structure 12 having any desired cross-sectional shape (e.g., circular, polygonal, etc.). System 10 may include at least a support 14 and a head 16. Head 16 may be coupled to and moved by support 14. In the disclosed embodiment of FIG. 1, support 14 is a robotic arm capable of moving head 16 in multiple directions during fabrication of structure 12, such that a resulting longitudinal axis of structure 12 is three-dimensional. It is contemplated, however, that support 14 could alternatively be an overhead gantry also capable of moving head 16 in multiple directions during fabrication of structure 12. Although support 14 is shown as being capable of 6-axis movements, it is contemplated that any other type of support 14 capable of moving head 16 in the same or in a different manner could also be utilized, if desired. In some embodiments, a drive may mechanically couple head 16 to support 14, and may include components that cooperate to move and/or supply power or materials to head 16.

Head 16 may be configured to receive or otherwise contain a matrix material. The matrix material may include any type of matrix material (e.g., a liquid resin, such as a zero volatile organic compound resin; a powdered metal; etc.) that is curable. Exemplary resins include thermosets, single- or multi-part epoxy resins, polyester resins, cationic epoxies, acrylated epoxies, urethanes, esters, thermoplastics, photopolymers, polyepoxides, thiols, alkenes, thiol-enes, and more. In one embodiment, the matrix material inside head 16 may be pressurized, for example by an external device (e.g., an extruder or another type of pump—not shown) that is fluidly connected to head 16 via a corresponding conduit (not shown). In another embodiment, however, the pressure may be generated completely inside of head 16 by a similar type of device. In yet other embodiments, the matrix material may be gravity-fed through and/or mixed within head 16. In some instances, the matrix material inside head 16 may need to be kept cool and/or dark to inhibit premature curing; while in other instances, the matrix material may need to be kept warm for the same reason. In either situation, head 16 may be specially configured (e.g., insulated, chilled, and/or warmed) to provide for these needs.

The matrix material may be used to coat, encase, or otherwise surround any number of continuous reinforcements (e.g., separate fibers, tows, rovings, and/or sheets of material) and, together with the reinforcements, make up at least a portion (e.g., a wall) of composite structure 12. The reinforcements may be stored within (e.g., on separate internal spools—not shown) or otherwise passed through head 16 (e.g., fed from external spools). When multiple reinforcements are simultaneously used, the reinforcements may be of the same type and have the same diameter and cross-sectional shape (e.g., circular, square, flat, etc.), or of a different type with different diameters and/or cross-sectional shapes. The reinforcements may include, for example, carbon fibers, vegetable fibers, wood fibers, mineral fibers, glass fibers, metallic wires, optical tubes, etc. It should be noted that the term "reinforcement" is meant to encompass both structural and non-structural types of continuous materials that can be at least partially encased in the matrix material discharging from head 16.

The reinforcements may be exposed to (e.g., coated with) the matrix material while the reinforcements are inside head 16, while the reinforcements are being passed to head 16, and/or while the reinforcements are discharging from head 16, as desired. The matrix material, dry reinforcements, and/or reinforcements that are already exposed to the matrix material (e.g., wetted reinforcements) may be transported into head 16 in any manner apparent to one skilled in the art.

The matrix material and reinforcement may be discharged from head 16 via at least two different modes of operation. In a first mode of operation, the matrix material and reinforcement are extruded (e.g., pushed under pressure and/or mechanical force) from head 16, as head 16 is moved by support 14 to create the 3-dimensional shape of structure 12. In a second mode of operation, at least the reinforcement is pulled from head 16, such that a tensile stress is created in the reinforcement during discharge. In this mode of operation, the matrix material may cling to the reinforcement and thereby also be pulled from head 16 along with the reinforcement, and/or the matrix material may be discharged from head 16 under pressure along with the pulled reinforcement. In the second mode of operation, where the matrix material is being pulled from head 16, the resulting tension in the reinforcement may increase a strength of structure 12, while also allowing for a greater length of unsupported material to have a straighter trajectory (i.e., the tension may act against the force of gravity to provide free-standing support for structure 12).

The reinforcement may be pulled from head 16 as a result of head 16 moving away from an anchor point 18. In particular, at the start of structure-formation, a length of matrix-impregnated reinforcement may be pulled and/or pushed from head 16, deposited onto anchor point 18, and cured, such that the discharged material adheres to anchor point 18. Thereafter, head 16 may be moved away from anchor point 18, and the relative movement may cause the reinforcement to be pulled from head 16. It should be noted that the movement of reinforcement through head 16 could be assisted (e.g., via internal feed mechanisms), if desired. However, the discharge rate of reinforcement from head 16 may primarily be the result of relative movement between head 16 and anchor point 18, such that tension is created within the reinforcement. It is contemplated that anchor point 18 could be moved away from head 16 instead of or in addition to head 16 being moved away from anchor point 18.

One or more cure enhancers (e.g., a UV light, an ultrasonic emitter, a laser, a heater, a catalyst dispenser, a microwave generator, etc.) 20 may be mounted proximate (e.g., within, on, and/or trailing from) head 16 and configured to enhance a cure rate and/or quality of the matrix material as it is discharged from head 16. Cure enhancer 20 may be controlled to selectively expose internal and/or external surfaces of structure 12 to energy (e.g., UV light, electromagnetic radiation, vibrations, heat, a chemical catalyst or hardener, etc.) during the formation of structure 12. The energy may increase a rate of chemical reaction occurring within the matrix material, sinter the material, harden the material, or otherwise cause the material to cure as it discharges from head 16.

A controller 22 may be provided and communicatively coupled with support 14, head 16, and any number and type of cure enhancers 20. Controller 22 may embody a single processor or multiple processors that include a means for controlling an operation of system(s) 10 and/or 12. Controller 22 may include one or more general- or special-purpose processors or microprocessors. Controller 22 may further include or be associated with a memory for storing data such as, for example, design limits, performance characteristics, operational instructions, matrix characteristics, reinforcement characteristics, characteristics of structure 12, and corresponding parameters of each component of system 10. Various other known circuits may be associated with controller 22, including power supply circuitry, signal-conditioning circuitry, solenoid/motor driver circuitry, communication circuitry, and other appropriate circuitry. Moreover, controller 22 may be capable of communicating with other components of system 10 via wired and/or wireless transmission.

One or more maps may be stored in the memory of controller 22 and used during fabrication of structure 12. Each of these maps may include a collection of data in the form of lookup tables, graphs, and/or equations. In the disclosed embodiment, the maps are used by controller 22 to determine desired characteristics of cure enhancers 20, the associated matrix, and/or the associated reinforcements at different locations within structure 12. The characteristics may include, among others, a type, quantity, and/or configuration of reinforcement and/or matrix to be discharged at a particular location within structure 12, and/or an amount, shape, and/or location of desired curing. Controller 22 may then correlate operation of support 14 (e.g., the location and/or orientation of head 16) and/or the discharge of material from head 16 (a type of material, desired performance of the material, cross-linking requirements of the material, a discharge rate, etc.) with the operation of cure enhancers 20 such that structure 12 is produced in a desired manner.

Figure 2:
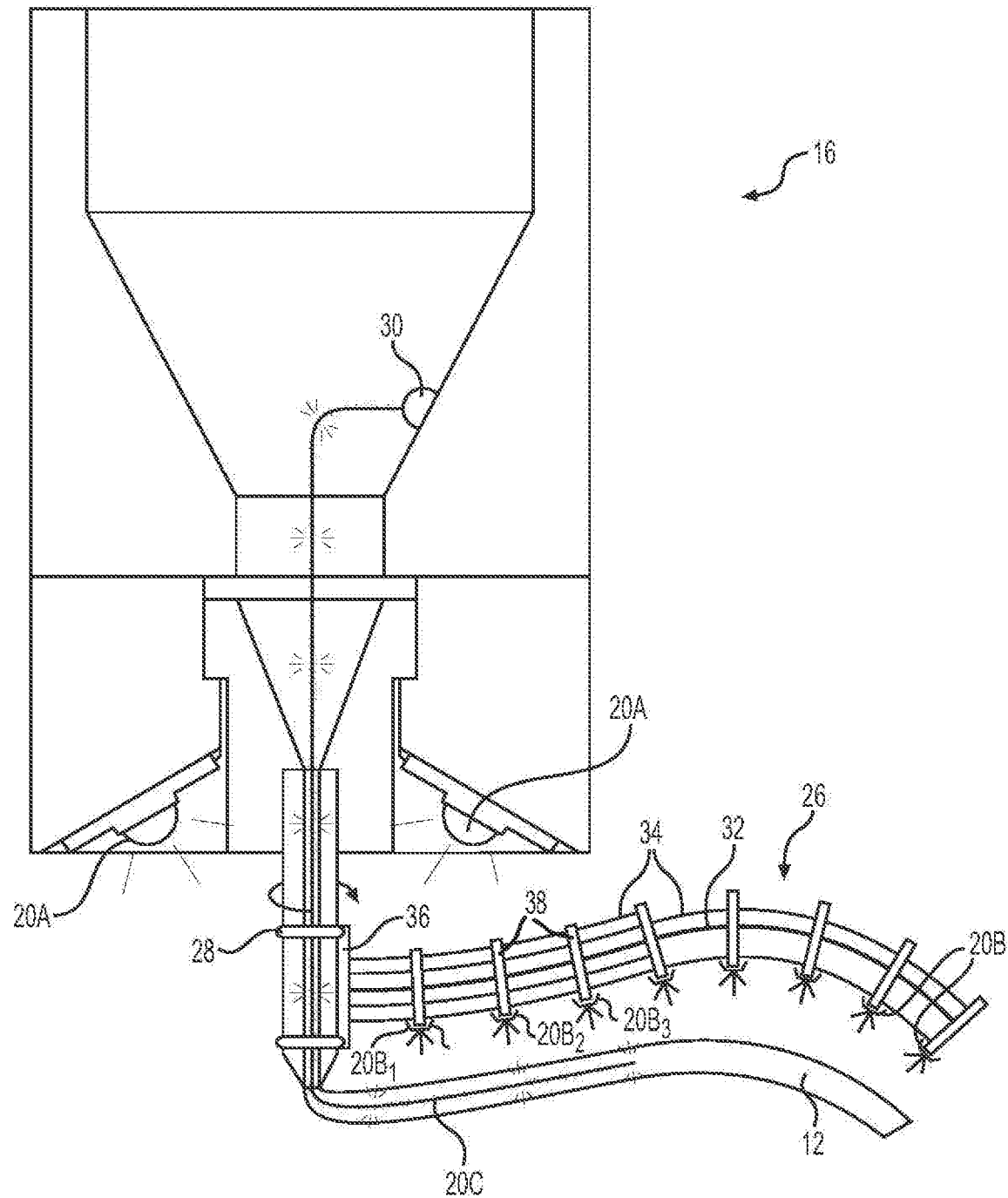
FIG. 2 is a diagrammatic illustration of an exemplary disclosed head that may be used in conjunction with the manufacturing system of FIG. 1.

In embodiment depicted in FIG. 2, multiple different types of cure enhancers 20 are connected to head 16. In a first example, one or more cure enhancers 20A are provided within a lower or exposed end of head 16 that is proximate (e.g., that at least partially surrounds a base end of) a nozzle 24. These cure enhancers 20A may embody LEDs (e.g., 4 different LEDs) that are equally distributed about a center axis of head 16. However, it is contemplated that any number of LEDs or other energy sources could alternatively be utilized for the disclosed purposes and/or arranged in another manner (e.g., unequally distributed, arranged in a row, etc.).

In another example, one or more cure enhancers 20B are located on an arm 26 that trails behind head 16. Cure enhancers 20B may be arranged along a length of arm 26, such that the area of energy exposure extends over an elongated section of discharged material. It is contemplated that the elongated section may begin at nozzle 24 or at a distance spaced away from nozzle 24, as desired. In addition, it is contemplated that different types of cure enhancers 20B may be connected to the same arm 26. For example, a first cure enhancer $20B_1$ may be located closest to nozzle 24 and embody a catalyst dispenser, while a next sequentially arranged cure enhancer $20B_2$ may be an ultrasonic type of cure enhancer, followed by a UV or infrared-heat cure enhancer $20B_3$. Other combinations and/or arrangements of cure enhancers 20B may also be possible.

In yet another example, one or more cure enhancers 20C may be located to enhance curing of discharging material from the inside-out. For example, cure enhancer(s) 20C may be towed from the tip of nozzle 24 and situated inside (e.g., at a general center) of the discharging material. In one embodiment, cure enhancer 20C is a fiber optic that extends from an energy source 30 through nozzle 24 to a point located downstream of nozzle 24. A distance of the fiber optic trailing from nozzle 24 may be variable, and related to a desired amount of curing, a viscosity of the matrix sliding around the fiber optic, and/or other similar factors. Energy source 30 may be located inside or outside of head 16. It is contemplated that instead of being configured to transmit light energy into the center of the discharging material, cure enhancer 20C could alternatively or additionally be configured to transmit heat and/or ultrasonic energy. For example, cure enhancer 20C may be an electrode connected to energy source 30 (e.g., a heat source or ultrasonic energy source) located inside of head 16.

It is contemplated that any combination of cure enhancers 20A, 20B, and/or 20C may be used together (e.g., at the same time or sequentially) to provide for desired curing of the composite material discharging from head 16. For example, when discharging a larger diameter, circular cross-section, multi-fiber, and/or generally opaque material (e.g., a carbon fiber based composite), all three types of cure enhancers 20 may be activated by controller 22. However, when discharging a smaller diameter, flat cross-section, single-fiber, and/or generally transparent material (e.g., a fiberglass based composite), only one or two types of cure enhancers 20 may be activated by controller 22. The amount of energy produced by any combination of active cure enhancers 20 may be sufficient to cure the matrix in the composite material before structure 12 axially grows more than a predetermined length away from head 16. In one embodiment, structure 12 is completely cured before the axial growth length becomes equal to an external diameter of the matrix-coated reinforcement.

Arm 26 may be moveable in multiple ways, allowing cure enhancer(s) 20B to follow a changing position and/or orientation of head 16 and yet remain adjacent (e.g., a particular distance offset to one side of) the material discharging from nozzle 24. In some embodiments, arm 26 may be configured to swing around nozzle 24, such that arm 26 and cure enhancer(s) 20B are always located at a trailing side of head 16. An actuator (e.g., a rotary actuator) 28 may be regulated by controller 22 to adjust the annular location of arm 26 and cure enhancer(s) 20B relative to head 16 as head 16 changes trajectory.

Arm 26 may additionally be able to shift radially relative to its own central axis. For example, arm 26 may embody a curving manipulator (a.k.a., a continuum robot, a snake-arm, or an elephant trunk) having a flexible core 32, and a plurality of linear elements (e.g., tendons, pistons, cables, etc.) 34 connected at different positions along the length of core 32. Controller 22 may be configured to selectively cause a length change of particular linear element(s) 34 (e.g., via one or more actuators 36), thereby causing arm 26 to bend at any position along its length and in any radial direction. In this manner, each of the associated cure enhancers 20B may be moved to and/or maintained at any particular offset relative to structure 12 during curing.

In some embodiments, it may be beneficial to provide control over trajectory of cure enhancer 20C. For example, controlled movement of cure enhancer 20C could be used to make final adjustments of the position, orientation, and/or shape of structure 12. The movements of cure enhancer 20C could be controlled, for example, via one or more electromagnets 38 mounted to arm 26 (e.g., to opposing lateral sides of arm 26). Specifically, magnets 38 could be selectively turned on/off to cause corresponding pushing and/or pulling of cure enhancer 20C (e.g., via internal ferromagnetic portions of cure enhancer 20C).

INDUSTRIAL APPLICABILITY

The disclosed system may be used to continuously manufacture composite structures having any desired cross-sectional shape, length, density, and/or strength. The composite structures may include any number of different reinforcements of the same or different types, diameters, shapes, configurations, and consists, and/or any number of different matrixes. In addition, the disclosed system may allow for use with a variety of different nozzles and for adjustable curing of a variety of discharging materials. Operation of system 10 will now be described in detail.

At a start of a manufacturing event, information regarding a desired structure 12 may be loaded into system 10 (e.g., into controller 22 that is responsible for regulating operation of support 14, head 16, and/or cure enhancer(s) 20). This information may include, among other things, a size (e.g., diameter, wall thickness, length, etc.), a contour (e.g., a trajectory), surface features (e.g., ridge size, location, thickness, length; flange size, location, thickness, length; etc.), connection geometry (e.g., locations and sizes of couplings, tees, splices, etc.), location-specific matrix stipulations, location-specific reinforcement stipulations, desired cure rates, cure locations, cure shapes, cure amounts, etc. It should be noted that this information may alternatively or additionally be loaded into system 10 at different times and/or continuously during the manufacturing event, if desired.

Based on the component information, a specific nozzle 24 and/or cure enhancer configuration may be connected to head 16, and one or more different (e.g., different sizes, shapes, and/or types of) reinforcements and/or matrix materials may be selectively installed within system 10 and/or continuously supplied into nozzle 24. For example, a nozzle 24 that is configured to discharge a flat ribbon of generally transparent fiberglass material or a nozzle 24 that is configured to discharge a round tow of generally opaque carbon fibers may be connected to head 16. In some embodiments, the reinforcements may also need to be connected to a pulling machine (not shown) and/or to a mounting fixture (e.g., to anchor point 18). Installation of the matrix material may include filling head 16 and/or coupling of an extruder (not shown) to head 16. Head 16 may then be moved by support 14 under the regulation of controller 22 to cause matrix-coated reinforcements to be placed against or on a corresponding anchor point 18.

Cure enhancers 20 may then be selectively activated (e.g., turned on/off and/or intensity-adjusted by controller 22) to cause hardening of the matrix material surrounding the reinforcements, thereby bonding the reinforcements to anchor point 18. With reference to the examples provided above, only cure enhancers 20A may be necessary to sufficiently cure the flat ribbon of generally transparent fiberglass, while both cure enhancers 20B and 20C may be necessary to sufficiently cure the round tow of generally opaque carbon fibers.

The component information may then be used to control operation of system 10. For example, the reinforcements may be pulled and/or pushed from head 16 (along with the matrix material), while controller 22 selectively causes support 14 to move head 16 in a desired manner, such that an axis of the resulting structure 12 follows a desired trajectory (e.g., a free-space, unsupported, 3-D trajectory). In addition, cure enhancers 20 may be selectively activated by controller 22 and/or adjusted to specific positions and/or orientations (e.g., via actuators 28 and/or 36) during material discharge from nozzle 24, such that a corresponding amount of energy from cure enhancer(s) 20 is absorbed by the discharging material at a desired location and in a desired shape. For example, controller 22 may selectively activate or adjust cure enhancer(s) 20A, 20B, and/or 20C based on at least one of a diameter, a shape, a number, and an opacity of the continuous reinforcement discharging from nozzle 24. Once structure 12 has grown to a desired length, structure 12 may be disconnected (e.g., severed) from head 16 in any desired manner. In some embodiments, adjustments may be made to cure enhancers 20 that are specific to anchoring processes, and different than adjustments made during general fabrication of structure 12. Controller 22 may implement these different adjustments automatically based on a phase of an ongoing fabrication process.

It will be apparent to those skilled in the art that various modifications and variations can be made to the disclosed systems and head. Other embodiments will be apparent to those skilled in the art from consideration of the specification and practice of the disclosed systems and heads. For example, it is contemplated that cure enhancer 20C may not actually protrude from the tip of nozzle 24. That is, cure enhancer 20C may extend from energy source 30 only to the tip of nozzle 24, if desired. It is intended that the specification and examples be considered as exemplary only, with a true scope being indicated by the following claims and their equivalents.

What is claimed is:

1. A head for an additive manufacturing system, comprising:
   an outlet configured to discharge a matrix;
   a plurality of cure enhancers configured to expose the matrix to a cure energy; and
   a manipulator connected to the head and configured to trail behind the outlet;
   wherein the plurality of cure enhancers is mounted to a side of the manipulator adjacent the matrix and arranged along a length of the manipulator; and
   wherein the manipulator is configured to maintain the plurality of cure enhancers parallel to a path of the matrix during trajectory changes of the head.

2. The head of claim 1, wherein the plurality of cure enhancers includes at least two different types of cure enhancers.

3. The head of claim 2, wherein the at least two different types include at least two of a UV light, an ultrasonic vibrator, a catalyst dispenser, and a heater.

4. The head of claim 1, wherein the curving manipulator includes:
   a flexible core; and
   a plurality of linear elements connected at different positions along a length of the flexible core.

5. The head of claim 4, wherein the manipulator is configured to move in a plurality of radial directions during length changes of the plurality of linear elements.

6. The head of claim 5, wherein the manipulator is further configured to rotate about the outlet.

7. The head of claim 1, further including a cure enhancer configured to trail from the outlet at a fixed distance inside of the matrix discharging from the outlet and effect curing of the matrix from inside of the matrix.

8. The head of claim 7, wherein the cure enhancer includes a source and an electrode configured to transmit at least one of heat and vibrational energy from the source into the matrix.

9. The head of claim 7, wherein the cure enhancer includes a source and a fiber optic configured to transmit light energy from the source into the matrix.

10. The head of claim 7, further including an energy source mounted inside the head, wherein the cure enhancer includes a flexible component that extends through the outlet to the energy source.

11. The head of claim 7, further including at least one magnet connected to the manipulator and operable to move the cure enhancer.

12. The head of claim 1, further including a plurality of cure enhancers mounted on a base of the head and arranged around the outlet.

13. A head for an additive manufacturing system, comprising:
   an outlet configured to discharge a matrix; and
   a cure enhancer comprising an energy source mounted inside the head and at least one flexible component extending from the energy source and through the outlet, wherein the at least one flexible component is configured to trail from the outlet at a fixed distance inside of the matrix discharging from the outlet and expose the matrix to a cure energy from inside of the matrix.

14. The head of claim 13, wherein the at least one flexible component comprises an electrode configured to transmit at least one of heat and vibrational energy from the source into the matrix.

15. The head of claim 13, wherein the at least one flexible component comprises a fiber optic configured to transmit light energy from the source into the matrix.

16. An additive manufacturing system, comprising:
   a support;
   a head mounted to the support and including:
      an outlet configured to discharge a material including at least a matrix;
      a first cure enhancer configured to expose an external surface of the material to cure energy from outside of the material; and
      a second cure enhancer comprising an energy source mounted inside the head and at least one flexible component extending from the energy source and through the outlet, wherein the at least one flexible component is configured to trail from the outlet at a fixed distance inside of the material discharging from the outlet and to expose an internal surface of the material to cure energy from inside of the material; and a controller configured to regulate operation of the support and the first and second cure enhancers.

17. The additive manufacturing system of claim 16, wherein:

the material further includes at least one continuous reinforcement coated with the matrix; and the controller is configured to selectively activate the first and second cure enhancers based on at least one of a diameter, a shape, a number and an opacity of the at least one continuous reinforcement.

18. The additive manufacturing system of claim 16, wherein:

the first cure enhancer includes at least one of:
 a cure enhancer mounted to a manipulator that trails behind the outlet at a side of the material; and
 a cure enhancer mounted at a base of the head; and the at least one flexible component of the second cure enhancer includes an electrode.

\* \* \* \* \*